(12) United States Patent
Muralidhara et al.

(10) Patent No.: US 12,271,305 B2
(45) Date of Patent: Apr. 8, 2025

(54) TWO-LEVEL MAIN MEMORY HIERARCHY MANAGEMENT

(71) Applicant: Intel Corporation, Santa Clara, CA (US)

(72) Inventors: Sai Prashanth Muralidhara, Portland, OR (US); Alaa R. Alameldeen, Hillsboro, OR (US); Rajat Agarwal, Portland, OR (US); Wei P. Chen, Portland, OR (US); Vivek Kozhikkottu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 17/214,818

(22) Filed: Mar. 27, 2021

(65) Prior Publication Data

US 2021/0216452 A1 Jul. 15, 2021

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0655* (2013.01); *G06F 3/0673* (2013.01); *G06F 2212/60* (2013.01)

(58) Field of Classification Search
CPC .. G06F 12/0802; G06F 3/0604; G06F 3/0673; G06F 2212/60
See application file for complete search history.

(56) References Cited

U.S. PATENT DOCUMENTS

| | | | |
|---|---|---|---|
| 2013/0091331 A1* | 4/2013 | Moraru | G06F 12/126 711/143 |
| 2016/0062660 A1 | 3/2016 | Kunimatsu et al. | |
| 2017/0185315 A1 | 6/2017 | Geetha et al. | |
| 2018/0129424 A1* | 5/2018 | Confalonieri | G06F 3/061 |
| 2018/0165207 A1* | 6/2018 | Yigzaw | G06F 11/2094 |
| 2019/0243788 A1* | 8/2019 | Stonelake | G11C 11/40607 |
| 2021/0056035 A1 | 2/2021 | Ramanujan et al. | |

(Continued)

OTHER PUBLICATIONS

Dutch and English Translation of Examination Report for Patent Application No. 2030989, Mailed Mar. 27, 2023, 14 pages.

(Continued)

*Primary Examiner* — Eric Cardwell
(74) *Attorney, Agent, or Firm* — Compass IP Law PC

(57) ABSTRACT

A two-level main memory in which both volatile memory and persistent memory are exposed to the operating system in a flat manner and data movement and management is performed in cache line granularity is provided. The operating system can allocate pages in the two-level main memory randomly across the first level main memory and the second level main memory in a memory-type agnostic manner, or, in a more intelligent manner by allocating predicted hot pages in first level main memory and predicted cold pages in second level main memory. The cache line granularity movement is performed in a "swap" manner, that is, a hot cache line in the second level main memory is swapped with a cold cache line in first level main memory because data is stored in either first level main memory or second level main memory not in both first level main memory and second level main memory.

19 Claims, 6 Drawing Sheets

(56) References Cited

U.S. PATENT DOCUMENTS

2021/0286555 A1* 9/2021 Li .................... G06F 3/0649

OTHER PUBLICATIONS

Chou et al, "CAMEO: A Two-Level Memory Organization with Capacity of Main Memory and Flexibility of Hardware-Managed Cache," 2014 47th Annual IEEE/ACM International Symposium on Microarchitecture, Dec. 13-17, 2014, 12 pages.
Oksin et al, "A Software-Managed Approach to Die-Stacked DRAM," 2015 International Conference on Parallel Architecture and Compilation (PACT), San Francisco, CA, Oct. 18-21, 2015, 13 pages.
Ryoo et al, "i-MIRROR: A Software Managed Die-Stacked DRAM-Based Memory Subsystem," 2015 27th International Symposium on Computer Architecture and High Performance Computing, Oct. 17-21, 2015, 8 pages.
Sim et al, "Transparent Hardware Management of Stacked DRAM as Part of Memory," 2014 47th Annual IEEE/ACM International Symposium on Microarchitecture, Cambridge, Dec. 13-17, 2014, 12 pages.

* cited by examiner

TWO-LEVEL MAIN MEMORY HIERARCHY MANAGEMENT

FIELD

This disclosure relates to a two-level main memory and in particular to data management in the two-level main memory.

BACKGROUND

A two-level main memory can include a first level comprising a volatile memory and a second level comprising a persistent memory. The second level is presented as "main memory" to the host operating system while the first level is a cache for the second level that is transparent (not exposed) to the host operating system.

The second level is the last level of the system memory hierarchy and the first level duplicates and caches a subset of the second level.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
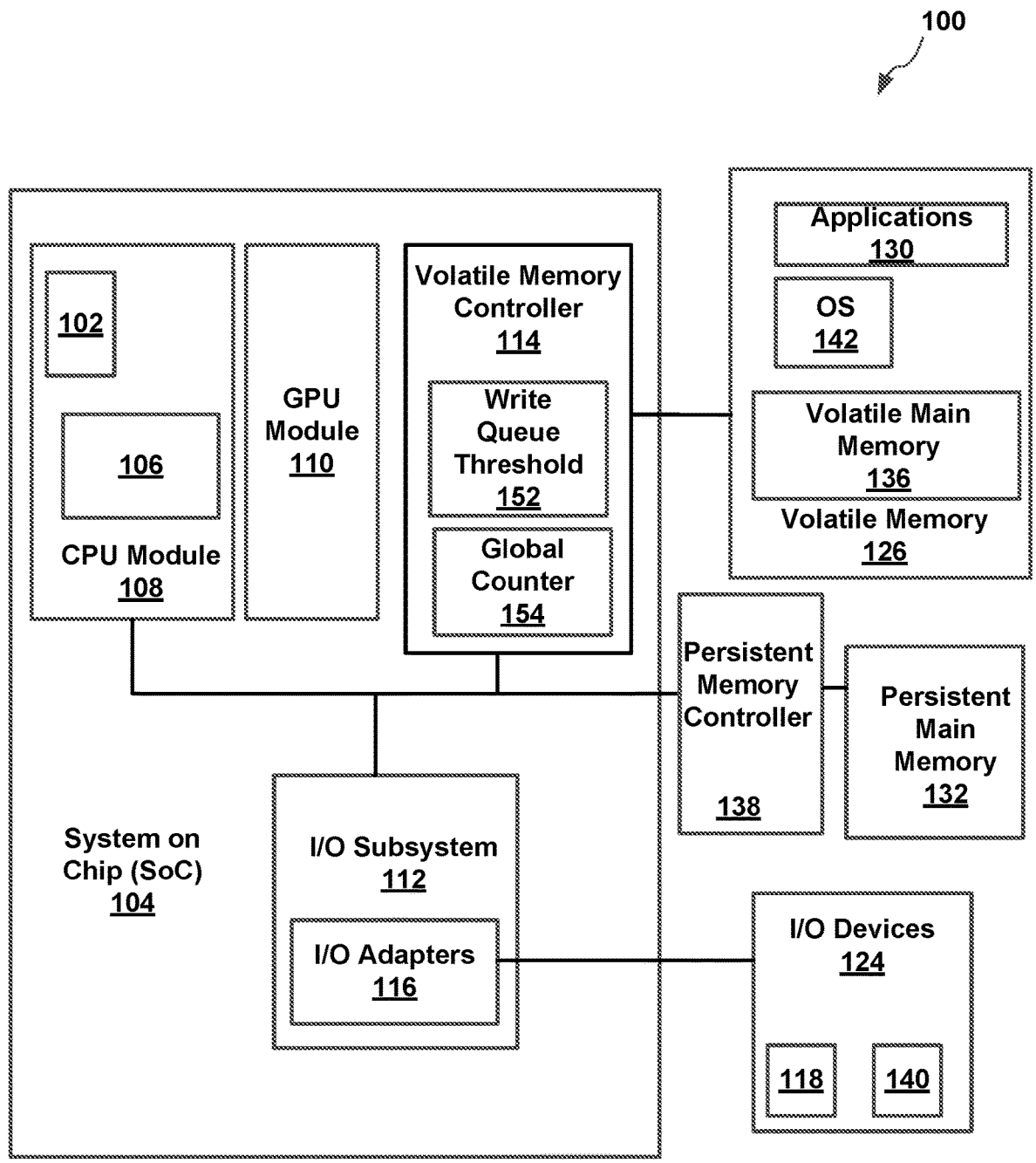
FIG. 1 is a block diagram of a computer system that includes a two-level main memory.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

When the ratio of the capacity of the second level main memory (also referred to as "far" memory) and the first level main memory (also referred to as "near" memory) is high, the first level main memory is only a small fraction of the second level main memory and using a small capacity of first level main memory relative to the second level main memory results in an increase in performance of the main memory in the system. For example, a 2 Terabyte two-level main memory can include 2 Terabyte persistent memory (second level main memory) and a 128 Gigabyte Dynamic Random Access Memory (DRAM) (first level main memory) with the 128 Gigabyte DRAM not exposed to the system.

When the ratio of the capacity of the second level main memory and the first level main memory is low, the capacity of the volatile memory that is not exposed in the two-level main memory is significant. For example, a 512 Gigabyte two-level main memory can include 512 Gigabyte persistent memory (second level main memory) and a 256 Gigabyte Dynamic Random Access Memory (DRAM) (first level main memory) with the 256 Gigabyte DRAM not exposed to the system. In this example, the ratio of the capacity of the first level main memory and the second level main memory is 2:1 and the first level main memory (50% of capacity of the second level main memory) is used for cache and not exposed to the system.

In order to expose the second level main memory to the system, the system memory (main memory) can be configured in a flat manner, that is, both the volatile memory (first level main memory) and the persistent memory (second level main memory) are exposed to the operating system and applications in the system. One or both of the operating system and applications in the system can manage data allocation and data movement between the volatile memory and the persistent memory.

In an embodiment, both the volatile memory and persistent memory are exposed to the operating system in a flat manner and data movement and management is performed in cache line granularity. The operating system can allocate pages in the two-level main memory randomly across the first level main memory and the second level main memory in a memory-type agnostic manner, or, in a more intelligent manner by allocating predicted hot pages in first level main memory and predicted cold pages in second level main memory. Irrespective of the type of allocation used by the operating system, a memory controller moves hot 64 Byte cache lines from the second level main memory to the first level main memory and moves cold 64 Byte cache lines to the second level main memory from the first level main memory. Hot data is efficiently and quickly moved from the second level main memory to the first level main memory while the first level main memory is exposed to the system. The first level main memory has a faster write access time than the second level main memory.

The cache line granularity movement is performed in a "swap" manner, that is, a hot cache line in the second level main memory is swapped with a cold cache line in first level main memory because data is stored in either first level main memory or second level main memory not in both first level main memory and second level main memory.

To avoid excessive use of persistent memory bandwidth because persistent memory has lower write bandwidth performance than volatile memory, swaps are performed probabilistically. For example, with a 10% probability, for example, a first level main memory miss triggers a swap between first level main memory and second level main memory, while the remaining 90% are read directly from second level main memory and forwarded to cache memory (Last Level Cache (LLC) also referred to as Level 3 (L3) cache/Mid Level Cache (MLC) also referred to as Level 2 (L2) cache/Level 1 (L1) cache) without replacing the contents of the first level main memory.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram of a computer system 100 that includes a two-level main memory. Computer system 100 can correspond to a computing device including, but not limited to, a server, a workstation computer, a desktop computer, a laptop computer, and/or a tablet computer.

The computer system 100 includes a system on chip (SOC or SoC) 104 which combines processor, graphics, memory, and Input/Output (I/O) control logic into one SoC package. The SoC 104 includes at least one Central Processing Unit (CPU) module 108, a volatile memory controller 114, a cache 106 (such as, Last Level Cache (LLC) also referred to as Level 3 (L3) cache/Mid Level Cache (MLC) also referred to as Level 2 (L2) cache/Level 1 (L1) cache) and a Graphics Processor Unit (GPU) 110. In other embodiments, the volatile memory controller 114 can be external to the SoC 104. Although not shown, each of the processor core(s) 102 can internally include one or more instruction/data caches, execution units, prefetch buffers, instruction queues, branch address calculation units, instruction decoders, floating point units, retirement units, etc. The CPU module 108 can correspond to a single core or a two-core general purpose processor, such as those provided by Intel® Corporation, according to one embodiment. In other embodiments, the CPU module 108 can correspond to a multi-core or many-core processor with more than two cores.

The two-level main memory includes a first level main memory 136 (that may also be referred to as "near" memory) in volatile memory 126 and persistent main memory 132 (second-level main memory that may also be referred to as "far" memory). The persistent main memory 132 is communicatively coupled to a persistent memory controller 138 that is communicatively coupled to the CPU module 108 in the SoC 104. The persistent main memory 132 can be included on a memory module, for example a dual in-line memory module (DIMM) that can be referred to as a non-volatile dual in-line memory module (NVDIMM). In addition to volatile main memory 136 (also referred to as first level main memory), applications 130 and an operating system (OS) 142 can be stored in volatile memory 126.

The volatile main memory (first level main memory) 136 can be coupled to the SoC 104 via high bandwidth, low latency means for efficient processing. The persistent main memory 132 of the two-level main memory can be coupled to the SoC 104 via low bandwidth, high latency means (as compared to that of the first level main memory 136). The volatile main memory 136 and the persistent main memory 132 are configured in a flat manner and both are presented to the OS 142 as system main memory.

The persistent main memory 132 is a non-volatile memory. A non-volatile memory (NVM) device is a type of memory whose state is determinate even if power is interrupted to the device. In one embodiment, the NVM device may include block or byte-addressable, write-in-place memories. Examples may include, but are not limited to, single or multi-level Phase Change Memory (PCM) or phase change memory with a switch (PCMS), non-volatile types of memory that include chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other types of block or byte-addressable, write-in-place memory.

The first level main memory 136 is a volatile memory. Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

In an embodiment, the first level main memory 136 of the two-level main memory is Synchronous Dynamic Random Access Memory (for example, JEDEC DDR SDRAM) (volatile memory) and the second level main memory 132 is a byte-addressable, write-in-place three dimensional cross point memory device (for example, Intel® 3D XPoint™ technology) (persistent memory). In another embodiment, the second level main memory 132 is a memory that has a slower write access time than the first level main memory 136.

The Graphics Processor Unit (GPU) 110 can include one or more GPU cores and a GPU cache which can store graphics related data for the GPU core. The GPU core can internally include one or more execution units and one or more instruction and data caches. Additionally, the Graphics Processor Unit (GPU) 110 can contain other graphics logic units that are not shown in FIG. 1, such as one or more vertex processing units, rasterization units, media processing units, and codecs.

Within the I/O subsystem 112, one or more I/O adapter(s) 116 are present to translate a host communication protocol utilized within the processor core(s) 102 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 116 can communicate with external I/O devices 124 which can include, for example, user interface device(s) including a display and/or a touch-screen display 140, printer, keypad, keyboard, communication logic, wired and/or wireless, storage device(s) 118 including hard disk drives ("HDD"), solid state drives ("SSD") 118, removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (Non-Volatile Memory Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

An operating system (OS) 142 is software that manages computer hardware and software including memory allocation and access to I/O devices. Examples of operating systems include Microsoft® Windows®, Linux®, iOS® and Android®.

Figure 2:
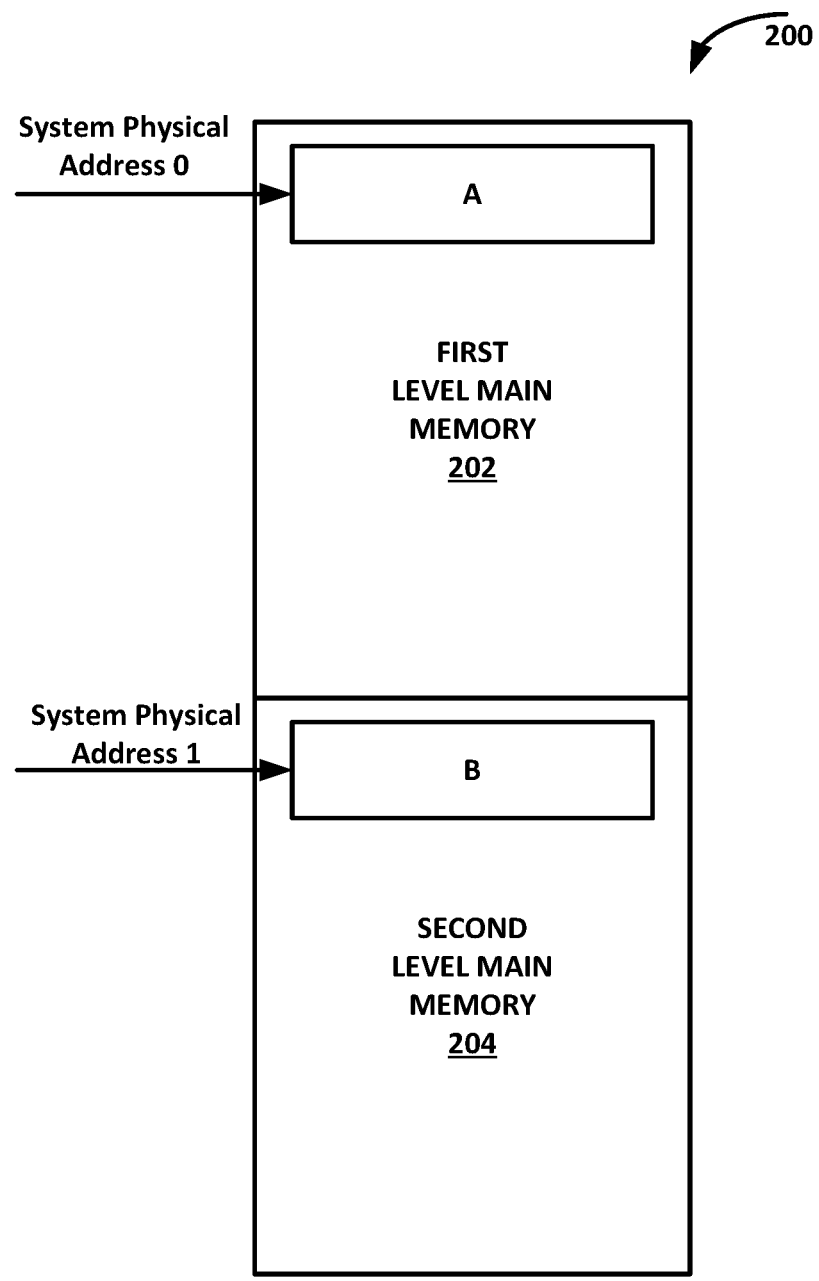
FIG. 2 is a conceptual view of system memory in which the ratio of the capacity of the first level main memory and the second level main memory is 1:1.

FIG. 2 is a conceptual view of system memory 200 in which the ratio of the capacity of the first level main memory and the second level main memory is 1:1. Both the first level main memory and the second level main memory are exposed to the operating system in a flat manner, with each level essentially 50% of the main memory address space. Data movement and management of the main memory is performed in cache line granularity. For a cache set in first level main memory, there are cache lines (set aliases) in second level main memory that are allocated to the cache set.

Referring to FIG. 2, cache line A is in first level main memory 202 and cache line B is in second level main memory 204. System Physical Address (SPA) decoding (System Physical Address 0, System Physical Address 1) determines cache line A to be in first level main memory 202 at System Physical Address 0 and cache line B to be in second level main memory 204 at System Physical Address 1. In the example shown, with the ratio of the capacity of the first level main memory and the second level main memory being 1:1, a single bit (having two states logical '1' or logical '0') is used to determine that cache line A is in first level main memory 202 and cache line B is in second level main memory 204.

Each of cache line A and cache line B can only be stored in one of first level main memory 202 or second level main memory 204. Cache line A and cache line B can be referred to as alias cache lines. Read and write access time to first level main memory 202 (volatile memory) is faster than to second level main memory (persistent memory) 204. Based on the number of accesses to cache line B in second level main memory 204 (if cache line B stores "hot data"), cache line B can be swapped with cache line A to improve read and write access time for cache line B.

When cache line swapping is enabled between second level main memory 204 and first level main memory 202 and the ratio of the capacity of the first level main memory and the second level main memory is 1:1, there are two permutations of cache line A and cache line B in second level main memory 204 and first level main memory 202. The first permutation is cache line A is in first level main memory 202 and cache line B is in second level main memory 204. The second permutation is cache line B is in first level main memory 202 and cache line A is in second level main memory 204.

Figure 3:
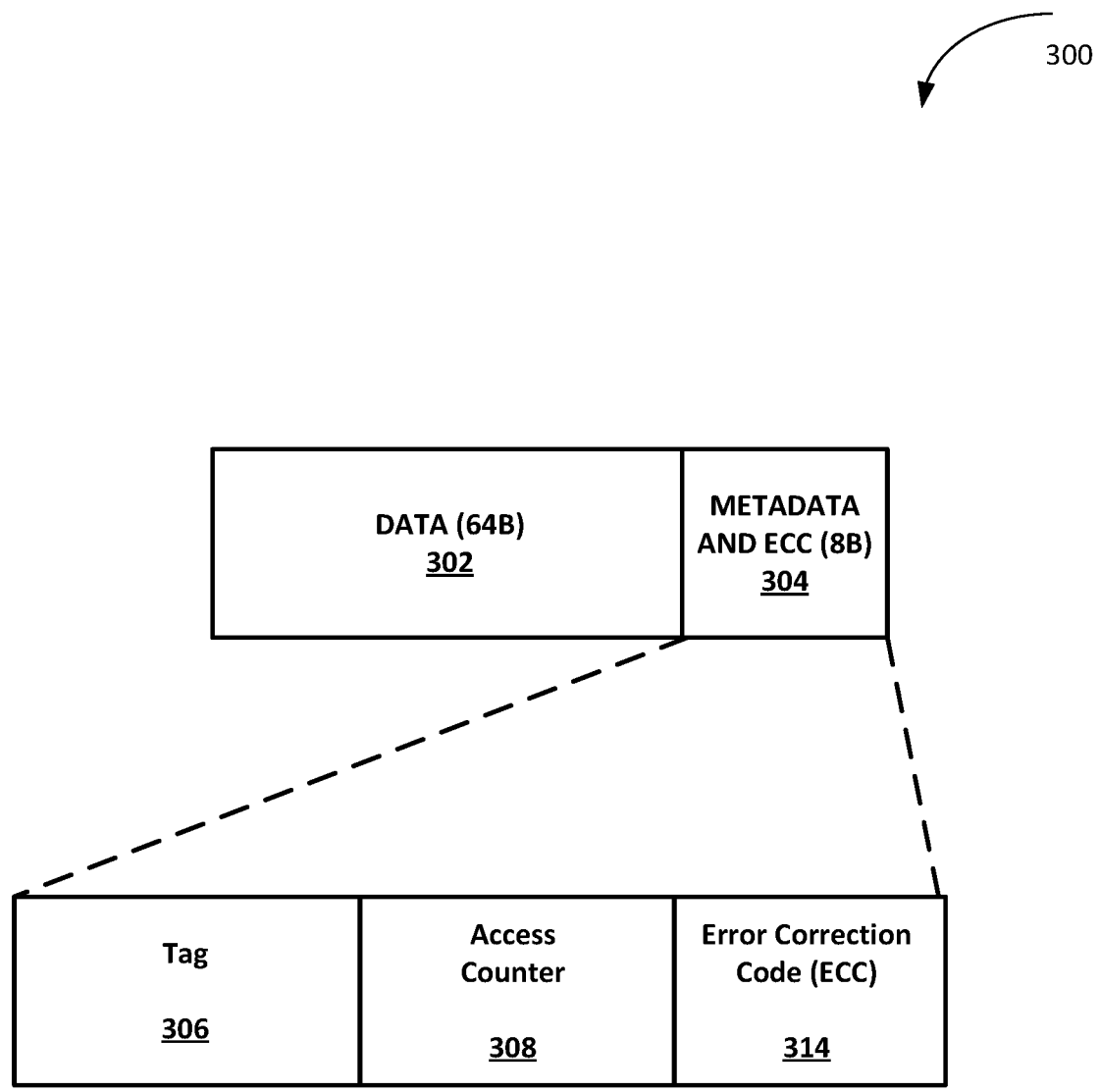
FIG. 3 is a conceptual view of a cache line in the first level main memory of the two-level main memory shown in FIG. 1.

FIG. 3 is a conceptual view of a cache line in the first level main memory 136 of the two-level main memory shown in FIG. 1.

Data is transferred between the persistent main memory 132 (second level of the two-level main memory) and the first level main memory 136 in blocks of fixed size, called cache lines or cache blocks. A cache line 300 includes data 302 and metadata and Error Correction Code (ECC) 304. The metadata and Error Correction Code (ECC) 304 includes ECC 314, tag 306, and access counter 308.

Figure 4:
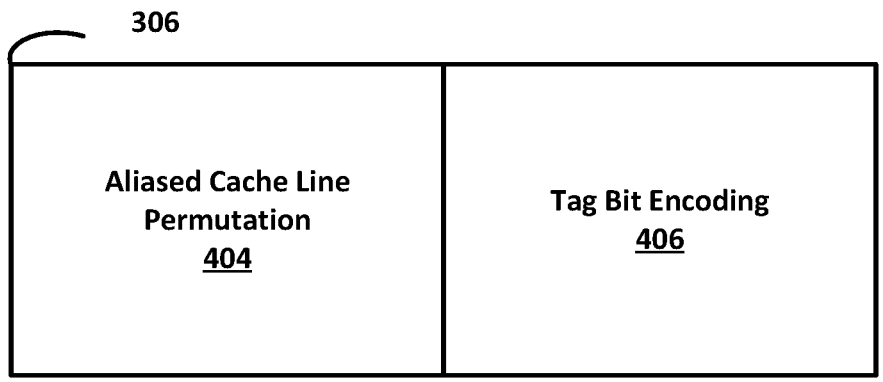
FIG. 4 illustrates the tag in the cache line that is used to determine which of the first level main memory and second level main memory stores a cache line.

FIG. 4 illustrates the tag 306 used to determine which of the first level main memory 202 and second level main memory 204 stores a cache line 300. With cache line swapping enabled between the first level main memory 202 and the second level main memory 204, a single bit (having two states logical '1' or logical '0') can incorrectly indicate that cache line A is in first level main memory 202 and cache line B is in second level main memory 204 if cache line A and cache line B have been swapped. Tag 306 includes aliased line locations (location permutation) 404, for example, tag bit encoding indicates the location permutation of either 'AB' or 'BA' and the corresponding tag bit encoding 406 (also referred to as tag-permutation bits) for the location permutation. A single bit in the tag bit encoding 406 can be used to encode the location permutation for 'AB' or 'BA'. For example, the tag bit encoding 406 is set to logical '1' to indicate that cache line A is in first level main memory 202 and cache line B is in second level main memory 204 and set to logical '0' to indicate that cache line B is in first level main memory 202 and cache line A 204 is in second level main memory (that is, cache line A and cache line B are swapped).

When the ratio of the capacity of the first level main memory and the second level main memory is 1:1, a single bit is sufficient to encode the location permutation 404 in the tag bit encoding 406. When the ratio of the capacity of the first level main memory and the second level main memory is 1:2, there are 6 aliased cache line locations 404 (factorial 3 (3!)) requiring 3 tag bits to encode. When the ratio of the capacity of the first level main memory and the second level main memory is 1:3, 5 tag bits are required to encode the aliased line locations.

Returning to FIG. 3, on every memory access to the first level main memory 202, the tag bit encoding 406 in tag 306 in the first level main memory 202 is read to determine whether the cache line is in the first level main memory 202 or the second level main memory 204. The tag bit encoding 406 is updated whenever the aliased cache lines (for example, cache line A and cache line B) are swapped so that the cache line that currently stores the data is selected for the memory access.

In an embodiment, the first level main memory 136 includes nine memory chips with data for the cache line stored across eight of the eight memory chips and metadata and ECC for the cache line stored in one of the nine memory chips. The nine memory chips may be on a Dual Inline Memory Module (DIMM). Each cache line (which may also be referred to as a cache block) is 64 Bytes (64 B), with each of the eight memory chips to store 8 Bytes of the 64 Byte cache line. Each 64 Byte cache line has 8 bytes of metadata and ECC. The metadata and Error Correction Code (ECC) 304 for each cache block is stored in the ECC chip as shown in FIG. 2.

Access counter 308 is incremented on every memory access to the cache line in first level main memory 202. In an embodiment the access counter 308 has three bits. In other embodiments the access counter 308 can have more or less than 3 bits. The access counter 308 is decremented on every access to an alias cache line to the cache line (for example, cache line B) in second level main memory 132.

The value (number) in the access counter 308 is used to determine when to swap a cache line into the first level main memory 202 from the second level main memory 204. The value of the access counter 308 indicates whether the cache line in the first level main memory 202 is hotter (the number of accesses is greater) than the corresponding aliased cache lines in the second level main memory 204. If the cache line in the first level main memory 202 is less hot (the number of accesses is less) than the corresponding aliased cache lines in the second level main memory 204, the cache line in the first level main memory 202 can be swapped out to the second level main memory 204.

Updating the access counter 308 in the first level main memory 202 incurs bandwidth overhead for the first level main memory 202. In an embodiment, to reduce the bandwidth overhead, the access counter 308 is updated on every nth access to the first level main memory 202. A global counter 154 in the volatile memory controller 114 is used to track the number of accesses to the first level main memory 202. In an embodiment n is programmable and can be 20.

Figure 5:
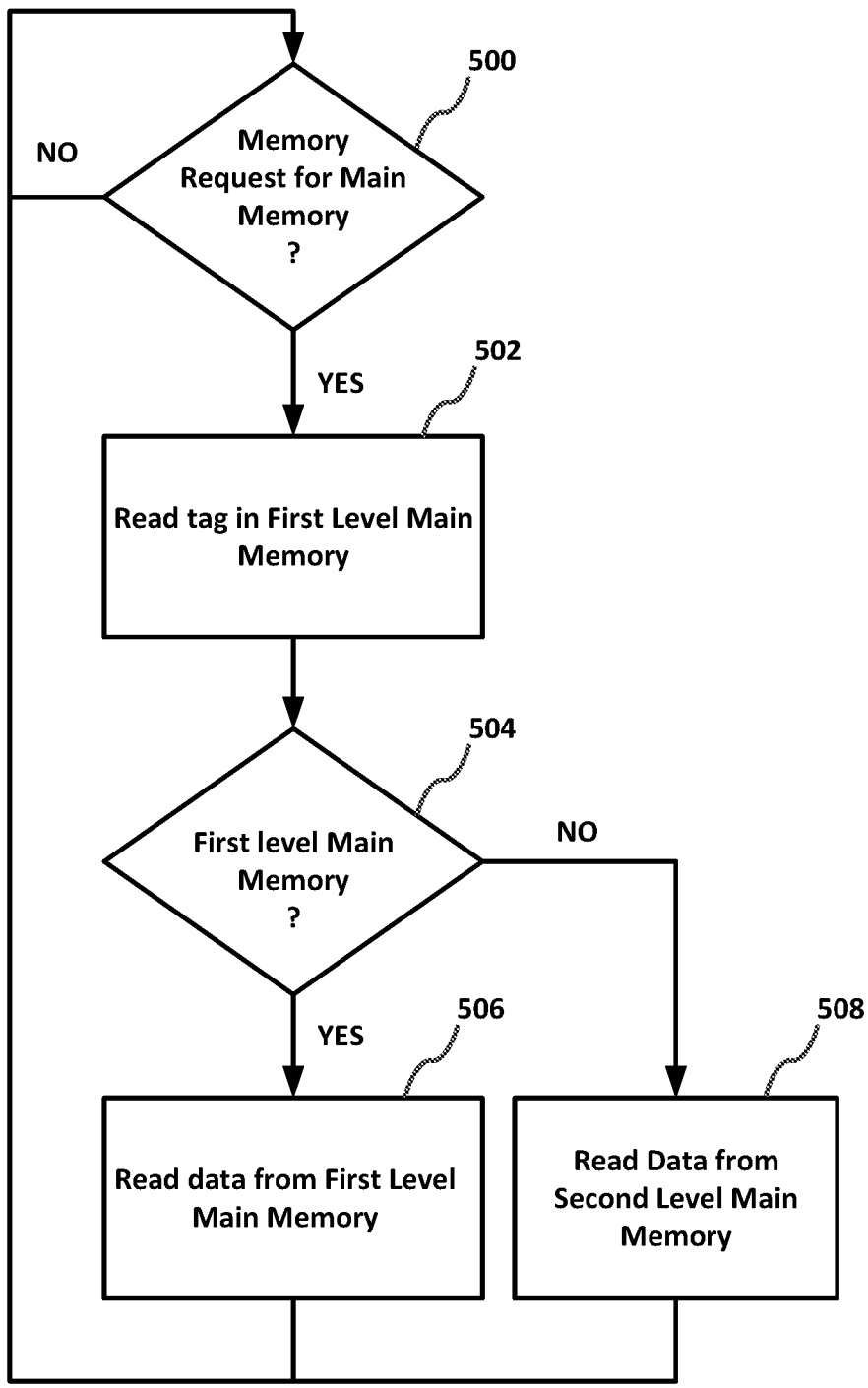
FIG. 5 is a flowgraph illustrating a method to perform a read operation in the two-level main memory.

FIG. 5 is a flowgraph illustrating a method to perform a read operation in the two-level main memory.

At block 500, if there is a memory read request for a cache line 300 in first level main memory 202, processing continues with block 502 to determine if the requested cache line in the memory request can be read from the first level main memory 202.

At block 502, the tag bit encoding 406 in tag 306 in the cache line 300 in the first level main memory 202 are read to determine if the cache line 300 is in the first level main memory 202. If it is the nth access to the first level main memory 202, the access counter 308 is incremented or decremented based on whether the requested line is in the first level main memory 202. Processing continues with block 504.

At block 504, if the cache line 300 is in the first level main memory 202, processing continues with block 506. If the cache line 300 is in the second level main memory 204, processing continues with block 508.

At block 506, the data stored in the requested cache line 300 in the first level main memory 202 is returned. Processing continues with block 500 to process another memory read request.

At block 508, the data for the requested cache line 300 in the first level main memory 202 is read from the alias cache line in the second level main memory 204. Processing continues with block 500 to process another memory read request.

Figure 6:
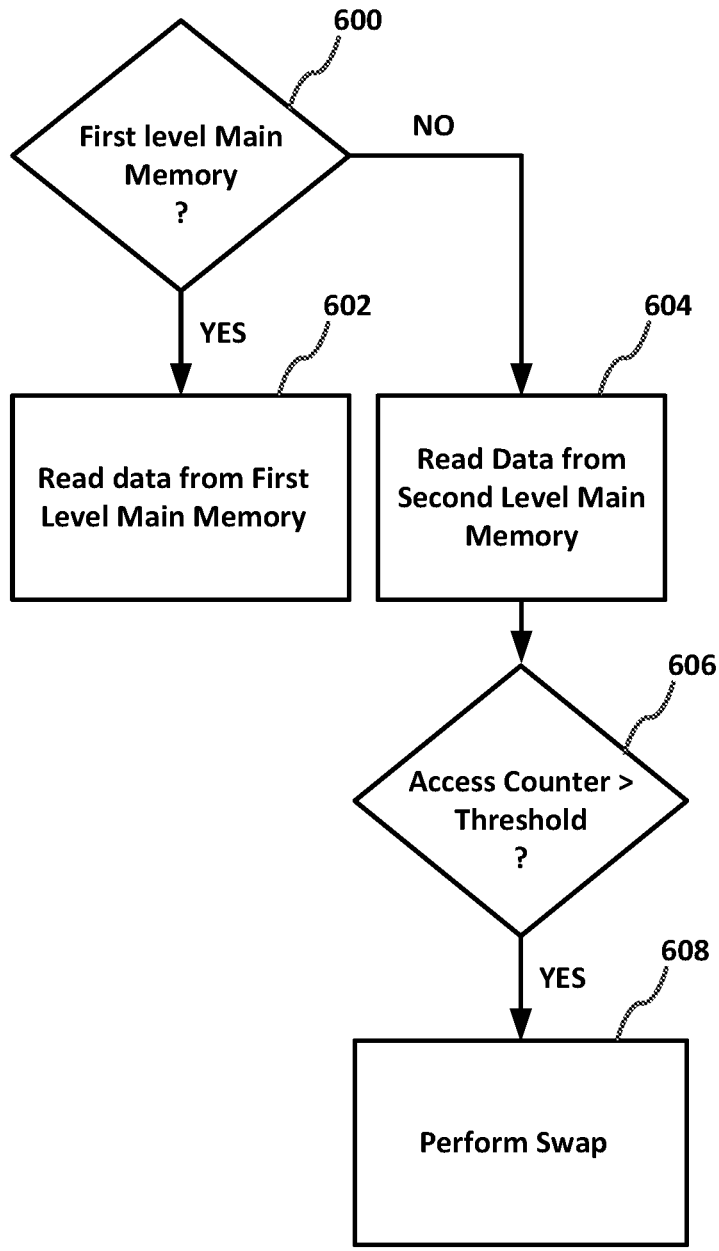
FIG. 6 is a flowgraph illustrating a method to swap cache lines between the first level main memory and the second level main memory.

FIG. 6 is a flowgraph illustrating a method to swap cache lines 300 between the first level main memory 202 and the second level main memory 204.

Every swap of a cache line 300 in the second level main memory 204 with an aliased cache line 300 in the first level main memory 202 incurs a write to the second level main memory 204. In order to reduce the number of writes to the slower second level main memory 204 due to cache line swaps, on a first level main memory miss, the cache line 300 in second level main memory 204 is written to first level main memory 202 and the cache line 300 in the first level main memory 202 is written to the second level main memory 204 if the value stored in the access counter 308 is greater than a threshold value.

At block 600, if the cache line 300 is in the first level main memory 202, processing continues with block 602. If the cache line 300 is in the second level main memory 204, processing continues with block 604.

At block 602, the data stored in the requested cache line 300 in the first level main memory 202 is returned.

At block 604, the data for the requested cache line 300 in the first level main memory 202 is read from the alias cache line 300 in the second level main memory 204. Processing continues with block 606.

At block 606, if the value (number) stored in the access counter 308 is greater than the threshold value, processing continues with block 608.

At block 608, the data stored in the cache line 300 in the first level main memory 202 is swapped with the data read from the alias cache line 300 in the second level main memory 204. The data is swapped by writing the data stored in the cache line 300 in the first level main memory 202 to the alias cache line 300 in the second level main memory 204 and writing the data stored in the alias cache line 300 in the second level main memory 204 to the first level main memory 202. The value stored in the access counter 308 is incremented each time there is a read access from any of the alias cache lines 300 in the second level main memory 204. The corresponding 406 is updated with the location permutation indicating the cache lines have been swapped.

In another embodiment, in addition to using the access counter 308 to determine when to swap the cache line 300 between the first level main memory 202 and the second level main memory 204, a number of write requests for the second level main memory 204 stored in a second level main memory write queue in persistent memory controller 138 is tracked by the volatile memory controller 114 to determine when to swap. While the number of write requests in the second level main memory write queue is above a threshold, the access counter is used to determine when to swap the cache line. While the number of write requests in the second level main memory write queue is below a write queue threshold stored in a write queue threshold register 152 in the volatile memory controller 114, the cache line 300 is swapped on the first access to the cache line 300 in the second level main memory 204.

Based on the value in the access counter 308 for the cache line in the first level main memory, the volatile memory controller 114 and the persistent memory controller 138 swap hot 64 B cache lines from second level main memory 204 into first level main memory 202 and swap cold 64 B cache lines 300 from first level main memory 202 into second level main memory 204. By allocating and moving data at 64 B cache line granularity, the capacity of first level main memory 202 is minimized because first level main memory 202 only stores hot cache lines not all of the cache lines in the same page as the hot cache lines. Furthermore, the volatile memory controller 114 and the persistent memory controller 138 can be configured to move a cache line 300 from the second level main memory 204 to the first level main memory 202 on a first access to the cache line 300 or on the nth access to the cache line, the system can be more reactive and adaptive to application phase changes.

With the probabilistic swap mechanism discussed in conjunction with FIG. 5 and FIG. 6, a first level main memory miss only triggers a swap with a small probability (e.g., 10%) while the remaining misses only read data from second level main memory 204 without moving it to first level main memory 202.

In another embodiment, the per cache line access counter 308 is not used to determine when to move data from the alias cache line in the second level main memory 204 to the first level main memory 202. Data swaps from second level main memory 204 to first level main memory 202 occur in only a small fraction (for example, 10%) of misses in the first level main memory 202. In the remaining misses in the first level main memory, data read from the second level main memory 204 is written directly to the cache memory (LLC/MLC/L1) in the SoC 104 without first being written to first level main memory 202. This can increase the first level main memory miss rate but reduces bandwidth of the second level main memory 204 significantly.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
   a main memory comprising a first level main memory and a second level main memory, a cache line located in the first level main memory and an alias cache line located in the second level main memory, a requested data stored in only one of the cache line or the alias cache line, the cache line encoded with:
   a location permutation tag to identify in which cache line location the requested data is stored, and
   an access counter to determine if data stored in the cache line is hot or cold relative to data stored in the alias cache line;
   the first level main memory and the second level main memory exposed to an operating system in a flat manner; and
   a memory controller coupled to the main memory, the memory controller to:
   read the location permutation tag in the cache line in the first level main memory to determine in which cache line location the requested data is stored,
   update the access counter on every nth access to the cache line located in the first level main memory, and
   read the access counter to determine whether to swap the requested data stored in the alias cache line with the data stored in the cache line.

2. The apparatus of claim 1, wherein the first level main memory has a faster write access time than the second level main memory.

3. The apparatus of claim 2, wherein the first level main memory is a volatile memory and the second level main memory is a persistent memory.

4. The apparatus of claim 3, wherein the persistent memory is a byte-addressable, write-in-place memory.

5. The apparatus of claim 1, wherein the cache line to store 64 bytes of data.

6. The apparatus of claim 1, wherein the memory controller further to:
   track a number of accesses to data in the cache line in the access counter, including to increment the access counter for accesses to data stored in the cache line and to decrement the access counter for accesses to data stored in the alias cache line,
   wherein the number of accesses tracked in the access counter is used to determine if data in the cache line is hot or cold relative to data in the alias cache line; and
   swap data in the alias cache line with data in the cache line when data in the alias cache line is hot relative to data in the cache line based on whether the access counter exceeds a threshold value.

7. A method comprising:
   storing data in a main memory, the main memory comprising a first level main memory and a second level main memory, a cache line located in the first level main memory and an alias cache line located in the second level main memory, a requested data stored in only one of the cache line or the alias cache line, the cache line encoded with a location permutation tag to identify in which cache line location the requested data is stored, the first level main memory and the second level main memory exposed to an operating system in a flat manner; and determining if data stored in the cache line is hot or cold relative to data stored in the alias cache line based on an access counter in the location permutation tag, including:

reading, by a memory controller coupled to the main memory, the location permutation tag in the cache line in the first level main memory to determine in which location the requested data is stored, updating the access counter on every nth access to the cache line located in the first level main memory, and reading the access counter to determine whether to swap the requested data stored in the alias cache line with the data stored in the cache line.

8. The method of claim 7, wherein the first level main memory has a faster write access time than the second level main memory.

9. The method of claim 8, wherein the first level main memory is a volatile memory and the second level main memory is a persistent memory.

10. The method of claim 9, wherein the persistent memory is a byte-addressable, write-in-place memory.

11. The method of claim 7, wherein the cache line to store 64 bytes of data.

12. The method of claim 7, further comprising:

tracking, in the access counter, a number of accesses to data in the cache line, including incrementing the access counter for accesses to data stored in the cache line and decrementing the access counter for access to data stored in the alias cache line, wherein the number of accesses tracked in the access counter is used to determine if data in the cache line is hot or cold relative to data in the alias cache line; and swapping data in the alias cache line with data in the cache line when data in the alias cache line is hot relative to data in the cache line based on whether the access counter exceeds a threshold value.

13. The method of claim 12, the memory controller to swap data between the alias cache line and the cache line based on the number of accesses to the cache line stored in the access counter, the memory controller to perform data movement in cache line granularity.

14. A system comprising:

a processor;

a main memory comprising a first level main memory and a second level main memory, the main memory communicatively coupled to the processor, a cache line located in the first level main memory and an alias cache line located in the second level main memory, a requested data stored in only one of the cache line or the alias cache line, the cache line encoded with:

a location permutation tag to identify in which cache line location the requested data is stored in the main memory, and an access counter to determine if data stored in the cache line is hot or cold relative to data stored in the alias cache line;

the first level main memory and the second level main memory exposed to an operating system in a flat manner; and a memory controller coupled to the main memory, the memory controller to:

read the location permutation tag in the cache line in the first level main memory to determine in which cache line location the requested data is stored, update the access counter on every nth access to the cache line located in the first level main memory, and read the access counter to determine whether to swap the requested data stored in the alias cache line with the data stored in the cache line.

15. The system of claim 14, wherein the first level main memory has a faster write access time than the second level main memory.

16. The system of claim 15, wherein the first level main memory is a volatile memory and the second level main memory is a persistent memory.

17. The system of claim 16, wherein the persistent memory is a byte-addressable, write-in-place memory.

18. The system of claim 14, wherein the memory controller further to:

track a number of accesses to data in the cache line in the access counter, including to:

increment the access counter for accesses to data stored in the cache line, and decrement the access counter for accesses to data stored in the alias cache line; and wherein the number of accesses tracked in the access counter is used to determine if data in the cache line is hot or cold relative to data in the alias cache line.

19. The system of claim 18, the memory controller further to:

swap data between the alias cache line and the cache line when data in the alias cache line is hot relative to data in the cache line based on whether the access counter exceeds a threshold value, the memory controller to perform data movement in cache line granularity.

* * * * *